(12) United States Patent
Chaudry et al.

(10) Patent No.: US 8,619,557 B2
(45) Date of Patent: Dec. 31, 2013

(54) SYSTEM AND METHOD FOR MANAGING NETWORK TRAFFIC LOAD UPON OUTAGE OF A NETWORK NODE

(75) Inventors: Shahid Rasul Chaudry, Ottawa (CA); Asif Hossain, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1260 days.

(21) Appl. No.: 11/292,976

(22) Filed: Dec. 2, 2005

(65) Prior Publication Data
US 2007/0127363 A1  Jun. 7, 2007

(51) Int. Cl.
H04L 12/26 (2006.01)

(52) U.S. Cl.
USPC .......................................... 370/229

(58) Field of Classification Search
None
See application file for complete search history.

(56) References Cited

U.S. PATENT DOCUMENTS

| | | | |
|---|---|---|---|
| 6,490,245 B2 | 12/2002 | Burns et al. | |
| 6,501,947 B1 * | 12/2002 | Hunzinger et al. | 455/414.1 |
| 6,810,263 B1 * | 10/2004 | Cheng et al. | 455/510 |
| 6,848,062 B1 | 1/2005 | Desai | |
| 7,333,438 B1 | 2/2008 | Rabie | |
| 2002/0106991 A1 | 8/2002 | Foore et al. | |
| 2002/0181503 A1 | 12/2002 | Montgomery, Jr. | |
| 2002/0183055 A1 | 12/2002 | Hunzinger et al. | |
| 2003/0117983 A1 | 6/2003 | Ton | |
| 2003/0152030 A1 | 8/2003 | Hershey | |
| 2003/0236905 A1 * | 12/2003 | Choi et al. | 709/231 |
| 2004/0266450 A1 | 12/2004 | Chowdhury | |
| 2005/0050209 A1 | 3/2005 | Main | |
| 2005/0086273 A1 * | 4/2005 | Loebbert et al. | 707/204 |
| 2006/0099932 A1 * | 5/2006 | Smith et al. | 455/412.1 |
| 2006/0148460 A1 | 7/2006 | Mukherjec | |
| 2006/0187841 A1 | 8/2006 | Palmer | |
| 2008/0117918 A1 | 5/2008 | Kobayashi | |

FOREIGN PATENT DOCUMENTS

WO  WO 2004/043092  * 5/2004 ............... H04Q 7/22

OTHER PUBLICATIONS

European Search Report; European Patent Office; May 17, 2006; 4 pages.
Canadian Office Action for Application No. 2,569,945; Canadian Intellectual Property Office; Mar. 5, 2009; 3 pages.
Canadian Office Action for Application No. 2,569,942; Canadian Intellectual Property Office; May 29, 2009; 3 pages.
Canadian Office Action for Application No. 2,569,945; Canadian Intellectual Property Office; Sep. 23, 2010; 3 pages.
"Unlicensed Mobile Access (UMA); Architecture (Stage 2)"; Technical Specification; Oct. 8, 2004; 80 pgs.
K. Hamzeh, "Point-To-Point Tunneling Protocol," Network Working Group, Apr. 1999, 48 pgs.
CIPO, Office Action, Application No. 2569945, Mar. 2, 2011, 4 pgs.

(Continued)

*Primary Examiner* — Chi Pham
*Assistant Examiner* — Mohammad Adhami
(74) *Attorney, Agent, or Firm* — The Danamraj Law Group, P.C.

(57) ABSTRACT

In one embodiment, a scheme is disclosed for managing network traffic load upon outage of a network node disposed in a wireless packet data network, wherein the network node is adapted to serve a substantially large number of mobile nodes using respective data connections. Upon encountering an outage-causing condition, the network node releases the data connections and generates session termination messages for transmission to the mobile nodes. Responsive to receiving the session termination messages, the mobile nodes variably delay their data session reconnect requests based on randomization.

14 Claims, 8 Drawing Sheets

(56) References Cited

OTHER PUBLICATIONS

USPTO, Office Action, U.S. Appl. No. 11/293,471, Dec. 23, 2008, 9 pgs.
USPTO, Office Action, U.S. Appl. No. 11/293,471, Jul. 22, 2009, 11 pgs.
USPTO, Office Action, U.S. Appl. No. 11/293,471, Dec. 11, 2009, 14 pgs.
USPTO, Office Action, U.S. Appl. No. 11/293,471, Jun. 25, 2010, 9 pgs.
USPTO, Office Action, U.S. Appl. No. 11/293,471, Jan. 24, 2011, 9 pgs.
USPTO, Office Action, U.S. Appl. No. 11/293,471, Jun. 20, 2011, 11 pgs.
CIPO, Notice of Allowance, Application No. 2,569,945, Feb. 6, 2012, 1 pg.
USPTO, Office Action, U.S. Appl. No. 11/293,471, Oct. 24, 2011, 10 pgs.
USPTO, Office Action, U.S. Appl. No. 11/293,471, Sep. 25, 2013, 9 pgs.

* cited by examiner

SYSTEM AND METHOD FOR MANAGING NETWORK TRAFFIC LOAD UPON OUTAGE OF A NETWORK NODE

CROSS-REFERENCE TO RELATED APPLICATION(S)

This application discloses subject matter that is related to the subject matter of the following U.S. patent application(s): (i) "SYSTEM AND METHOD FOR MANAGING NETWORK TRAFFIC LOAD UPON OUTAGE OF A NETWORK NODE", application Ser. No. 11/293,471, filed even date herewith, which is (are) hereby incorporated by reference.

FIELD OF THE DISCLOSURE

The present patent disclosure generally relates to wireless packet data networks. More particularly, and not by way of any limitation, the present patent disclosure is directed to a system and method for managing network traffic load upon outage of a network node disposed in a wireless packet data network, wherein the network node is adapted to serve a number of mobile nodes.

BACKGROUND

When an Internet Protocol (IP)-capable wireless network experiences an outage-causing condition at a packet data capable network node that facilitates data connections to mobile nodes that are adapted to execute "always on" applications, a large number of data connections may be released at the same time. In such cases, data session termination messages are received by the mobile nodes wherein the "always on" applications attempt to start their data sessions right away. This condition results in heavy loading on the network infrastructure because of the huge number of data connection requests emanating from the mobile nodes.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a scheme for managing network traffic load upon outage of a network node disposed in a wireless packet data network, wherein the network node is adapted to serve a substantially large number of mobile nodes using respective data connections. In particular, the teachings herein are especially advantageous with respect to mobile nodes adapted to execute applications that are required to have what is known as "always on" connectivity. Upon encountering an outage-causing condition, the network node releases the data connections and generates session termination messages for transmission to the mobile nodes. Responsive to receiving the session termination messages, the mobile nodes variably delay their data session reconnect requests based on randomization, thereby reducing the "bursty" network messaging that would have otherwise resulted if the mobile nodes attempted to transmit the reconnect messages nearly at the same time after the outage.

In one aspect, a method is disclosed for managing network traffic load upon outage of a network node disposed in a wireless packet data network, wherein the network node is adapted to serve a plurality of mobile nodes using respective data connections, the method comprising: generating session termination messages by the network node for transmission to the mobile nodes and releasing the respective data connections by the network node upon encountering an outage-causing condition; and responsive to receiving the session termination messages, delaying generation of data session reconnect requests by at least a portion of the mobile nodes, wherein the delaying is modulated based on randomization for one or more mobile nodes.

In another aspect, a method is disclosed for managing network traffic load upon outage of a network node disposed in a wireless packet data network, wherein the network node is adapted to serve a plurality of mobile nodes using respective data connections, the method comprising: receiving a session termination message by a mobile node pursuant to releasing the mobile node's data connection by the network node upon encountering an outage-causing condition at the network node; and responsive to receiving the session termination message, delaying generation of a data session reconnect request by the mobile node, wherein the delaying is modulated based on generating a random time variable by the mobile node.

In yet another aspect, a system is disclosed for managing network traffic load upon outage of a network node disposed in a wireless packet data network, wherein the network node is adapted to serve a plurality of mobile nodes using respective data connections, the system comprising: means associated with a mobile node for receiving a session termination message that is generated pursuant to releasing the mobile node's data connection by the network node upon encountering an outage-causing condition at the network node; and means associated with the mobile node, operable responsive to receiving the session termination message, for delaying generation of a data session reconnect request by the mobile node, wherein the delaying is modulated based on generating a random time variable by the mobile node.

In a still further aspect, a mobile node operable in a wireless packet data network is disclosed, the mobile node comprising: a logic structure for processing a session termination message that is received pursuant to releasing the mobile node's data connection by a network node upon encountering an outage-causing condition at the network node; and a logic structure, operable responsive to processing the session termination message, for delaying generation of a data session reconnect request by the mobile node, wherein the delaying is modulated based on generating a random time variable by the mobile node.

Figure 1:
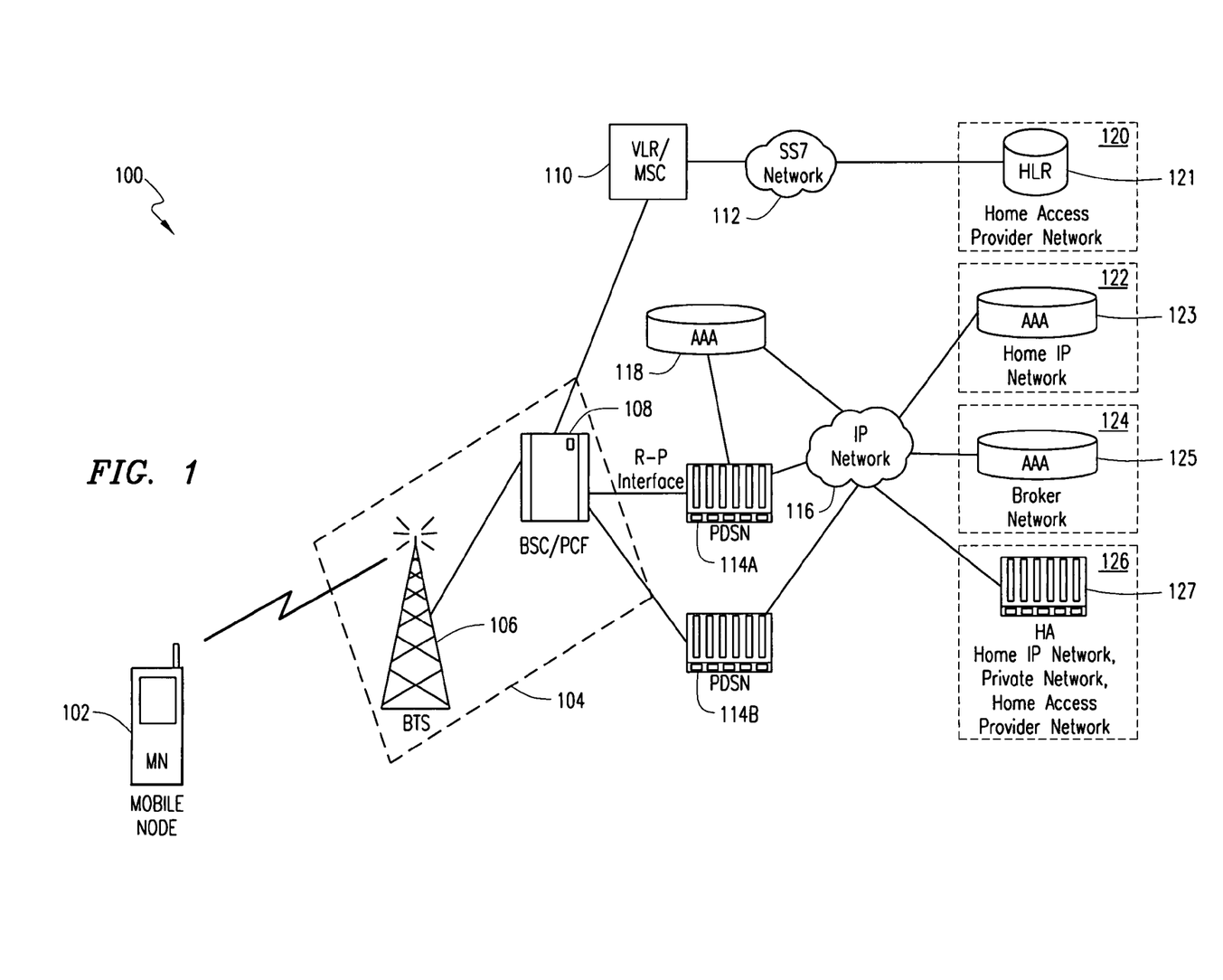
FIG. 1 depicts a wireless packet data network (WPDN) environment wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary wireless packet data network (WPDN) environment 100 is depicted wherein an embodiment of the present patent disclosure may be practiced for managing network traffic load upon outage of a data-capable network node disposed therein for serving a mobile node 102 adapted to execute one or more "always on" applications. By way of example, the illustrated WPDN environment 100 is implemented as a data-capable Code Division Multiple Access (CDMA) network (e.g., CDMA 2000), although it is envisaged that the teachings hereof may be applied in any $3^{rd}$ Generation Partnership Project (3GPP)-compliant cellular network (e.g., 3GPP or 3GPP2) with appropriate modifications and extensions. Mobile node 102 may comprise any untethered user equipment operable to obtain IP-based packet data service within the WPDN environment 100, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like.

A Radio Access Network (RAN) 104 comprising a Base Transceiver Station (BTS) 106 and an integrated Radio/Packet (RP) functionality 108 forms a network portion that provides access to both circuit-switched cellular telephony network portions as well as packet-switched network portions of the WPDN environment 100. By way of illustration, a Visitor Location Register (VLR) and associated Mobile Switching Center (MSC) 110, a Signaling System No. 7 (SS7) network 112, and a Home Access Provider network 120 that includes a Home Location Register (HLR) 121 exemplify the cellular telephony network portion that may be accessed using the Base Station Controller (BSC) functionality of the integrated RP module 108. A Packet Control Function (PCF) of the RP module 108 is operable to effectuate data connectivity between the mobile node 102 and the packet data network portions via an R-P interface to a network node cluster comprising one or more Packet Data Serving Nodes, e.g., PDSN 114A and 114B, whereby a Point-to-Point Protocol (PPP) data session may be established with respect to the mobile node 102. The remaining portions of the WPDN environment 100 will be described in reference to a particular PDSN, e.g., PDSN 114A, although similar WPDN infrastructure may be deployed with respect to the other PDSN elements as well.

In general, PDSN 114A and PDSN 114B are coupled via an IP network 116 to a number of Authentication, Authorization and Accounting (AAA) servers for managing packet data services on behalf of the mobile node 102, including providing access to external IP networks such as, e.g., the Internet. As illustrated, a Home IP network 122 includes a Remote Authentication Dial In User Service (RADIUS)-based AAA server 123 for providing AAA services as an Access Registrar (AR) for the user/subscriber associated with mobile node 102. The Home IP network 122 may comprise a private corporate network, publicly accessible network, or an International Mobile Telecommunications (IMT)-2000 network. A Visited RADIUS/AAA server 118 is operable as an AR when the mobile node 102 is roaming. A Home Agent 127 disposed in another network portion 126 is coupled via the IP network 116 to PDSN 114 for providing, inter alia, data mobility bindings as will be described below. A Broker RADIUS network 124 includes one or more Broker RADIUS servers 125 that maintain security relationships with the Visited RADIUS server 118 as well as the Home RADIUS server 123 for transferring RADIUS messages between a Visited Access Provider network portion and the Home IP network 122.

When the user first makes a data call using the mobile node 102, it establishes a PPP session with a PDSN, e.g., PDSN 114A, which may authenticate the mobile node 102 by communicating with an appropriate AAA server. For example, PDSN 114A may first communicate with the Visited AAA server 118 which in turn may communicate with the Home AAA server 123, possibly through some Broker RADIUS servers (e.g., Broker RADIUS server 125). The Home AAA server 123 verifies that the user is a valid subscriber, determines what services are available for the user, and tracks usage for billing. After the mobile node 102 is authenticated, it may use the IP Control Protocol (IPCP) to request an IP address for commencing a packet data session.

In general operation, a packet data session describes an instance of continuous use of packet data service by the user of appropriate wireless IP equipment (e.g., mobile node 102). Typically, a packet data session begins when the user invokes packet data service, and it ends when the user or the network terminates the service. During a particular packet data session, the user may change locations but the same IP address is maintained.

A PPP session describes the time during which a particular PPP connection instance is maintained in the open state in both the mobile node and PDSN. Typically, the PPP session is maintained during periods even where the mobile node is dormant. If the user hands off from one RAN to another RAN but is still connected to the same PDSN, the PPP session remains. On the other hand, if the user changes PDSN coverage area or if the user reestablishes a different data connection because of an outage at the previous PDSN, a new PPP session is created at the new PDSN.

Figure 2:
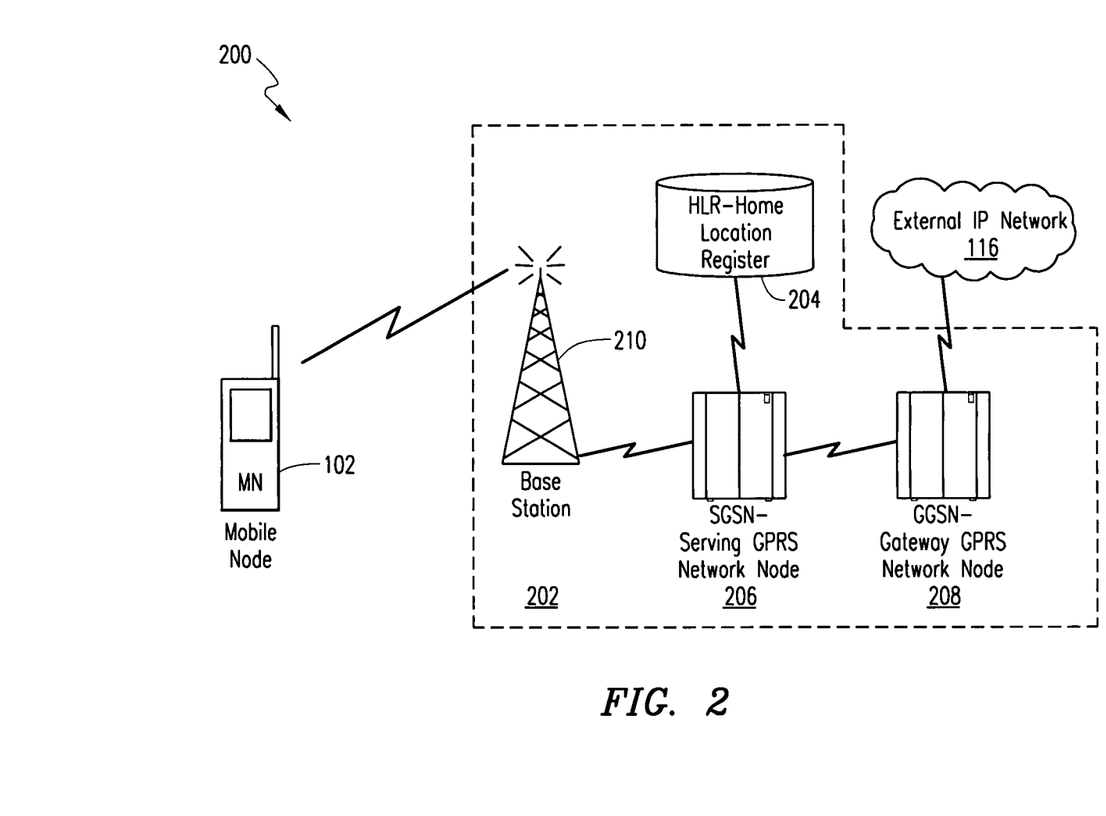
FIG. 2 depicts another WPDN environment wherein an embodiment of the present patent disclosure may be practiced.

FIG. 2 depicts another WPDN environment 200 wherein an embodiment of the present patent disclosure may be practiced for managing network traffic load upon outage of a data-capable network node disposed therein for facilitating data connectivity with respect to a mobile node, e.g., mobile node 102. As illustrated, reference numeral 202 refers to a General Packet Radio Service (GPRS) network that provides a packet radio access for mobile devices using the cellular infrastructure of a Global System for Mobile Communications (GSM)-based carrier network. As is well known, GPRS uses a packet-switching technique to transfer both high-speed and low-speed data and signaling in an efficient manner over GSM radio networks. Packet switching means that GPRS radio resources are used only when users are actually sending or receiving data. Rather than dedicating a radio channel to a mobile data user, e.g., mobile node 102, for a fixed period of time, the available radio channels can be concurrently shared between several users. Therefore, GPRS is designed to support from intermittent and bursty data transfers (e.g., web browsing) to occasional transmission of large volumes of data (e.g., FTP). Allocation of GPRS radio channels can be flexible: from 1 to 8 radio interface timeslots can be allocated per one Time Division Multiple Access (TDMA) frame. Typically, timeslots are shared by the active users, and uplinks and downlinks are allocated separately. Various radio channel coding schemes are available to allow a range of data bit transfer rates.

Two additional network nodes are provided within the GSM network in order to implement a packet-switched data transfer service. A Serving GPRS Support Node (SGSN) 206, which is coupled to a Home Location Register (HLR) 204 and disposed at the same hierarchical level as a Mobile Switching Center (MSC) of the underlying circuit-switched cellular network, is operably coupled to a BTS 210 and keeps track of the location of a GPRS user such as the mobile node 102. Further, SGSN 206 is responsible for performing security functions and handling access control with respect to mobile node 102. One or more Gateway GPRS Support Node (GGSN) elements, e.g., GGSN 208, provide interworking with the external packet-switched IP network 116, and are operably coupled to one or more SGSNs, e.g., SGSN 206, via an IP-based GPRS backbone network.

In order to access the packet data service, mobile node 102 makes its presence known to the network by performing what is known as a GPRS Attach. Thereafter, to send and receive packet data, mobile node 102 activates the packet data address that it wants to use. This operation renders mobile node 102 "visible" in the corresponding GGSN, and interworking with external data networks can then begin. User data is transferred transparently between mobile node 102 and the external data networks with a method known as encapsulation and tunneling wherein data packets are equipped with GPRS-specific protocol information and transferred transparently between mobile node 102 and GGSN 208. To get access to the GPRS network 202 and to start data transmission, various signaling procedures are therefore effectuated before activating a Packet Data Protocol (PDP) context or session between mobile node 102 and the network. Accordingly, it should be appreciated that when a data connection effectuating the current PDP session via a particular GGSN is lost for some reason, a mobile node that is required to maintain an "always on" data service will repeatedly attempt to generate appropriate reconnect requests towards the network 202 so as to regain connectivity.

Figure 3:
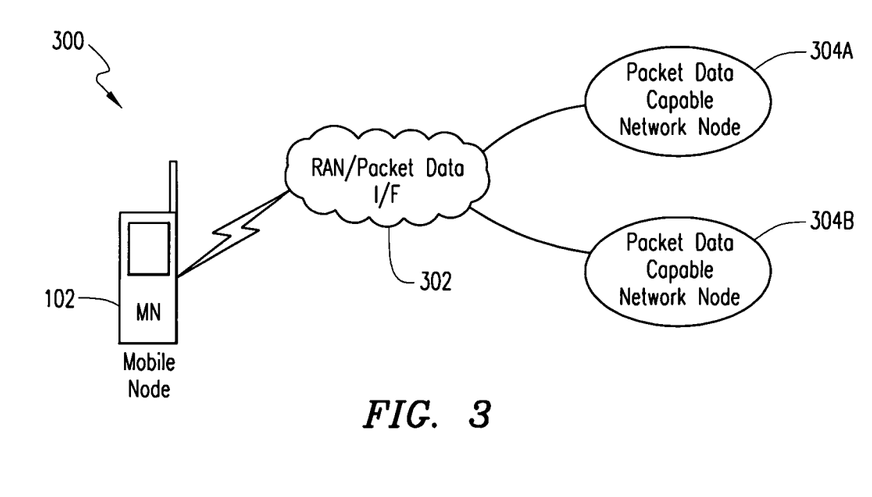
FIG. 3 depicts a generalized WPDN environment wherein an embodiment of the present patent disclosure may be practiced.

FIG. 3 depicts a more generalized WPDN environment 300 that abstracts the details of various data-capable wireless networks such as the CDMA and GPRS network environments described above, wherein an embodiment of the present patent disclosure may be practiced for reducing network traffic load that may be generated due to outage of a network node. The WPDN environment 300 is exemplified with an appropriate RAN/packet data interface (I/F) 302 operable to support radio connectivity with mobile node (MN) 102, which could be variable based on the underlying cellular technology. Two packet data capable network nodes 304A, 304B with which MN 102 can establish a data connection e.g., PDSN elements in a CDMA network or GGSN elements in a GPRS network, are disposed in the network environment 300 for facilitating data sessions with respect to MN 102. Although not shown in this FIG., it should be apparent that the network nodes 304A, 304B are operable to maintain a substantially large number of data connections (e.g., thousands of connections) for serving a correspondingly large number of mobile nodes respectively.

Figure 4A:
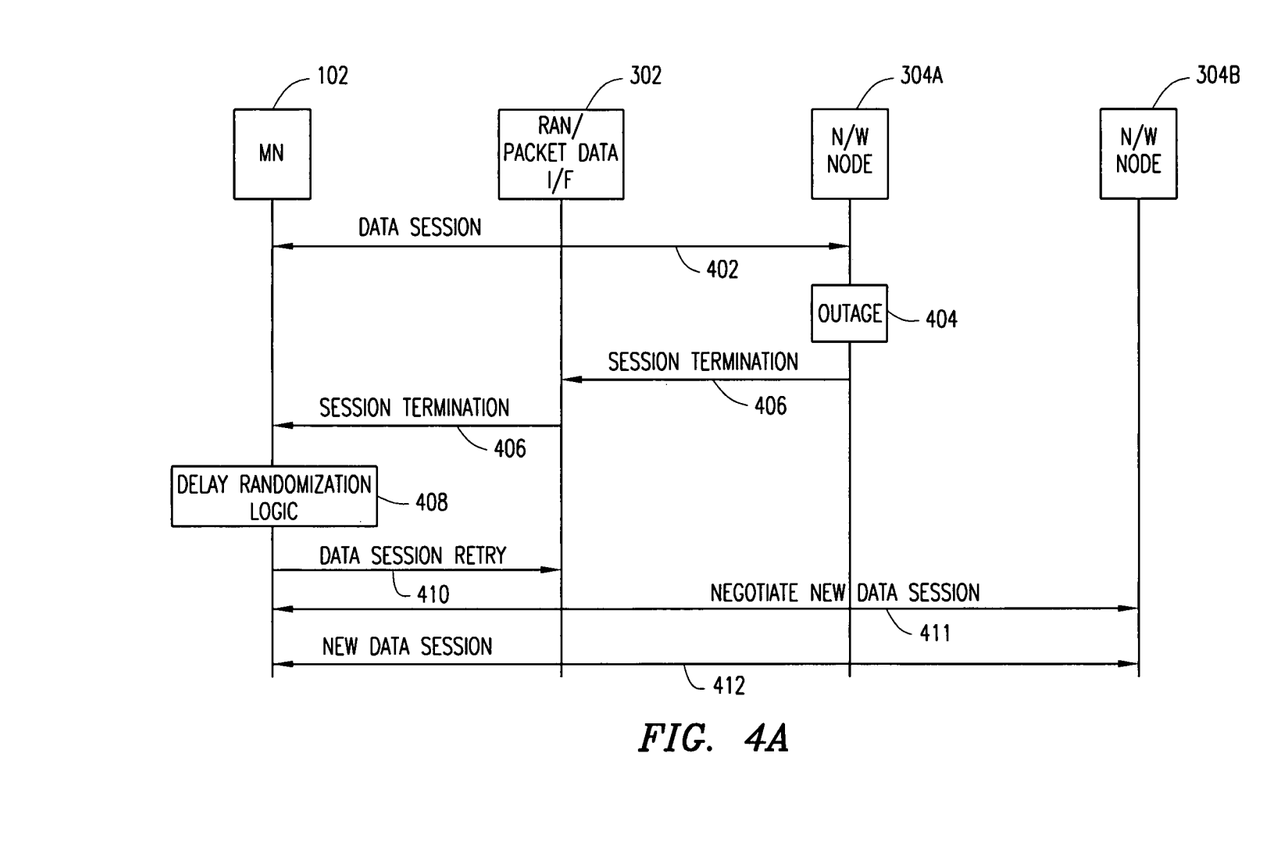
FIG. 4A depicts a message flow diagram in accordance with an embodiment of the present patent disclosure.

When a particular serving network node, e.g., node 304A, encounters an outage-causing condition (for instance, such as a power failure, a race condition experienced by the service logic of the node, a manual reset, or an automatic shutdown, et cetera), all the data connections maintained by the node 304A are released substantially simultaneously. FIG. 4A depicts a message flow diagram in accordance with an embodiment of the present patent disclosure for managing network traffic load in such a scenario. Reference numeral 402 refers to a data session connection between MN 102 and the network node 304A. Upon experiencing an outage condition 404 at the network node 304A, appropriate session termination messages, e.g., termination 406, are transmitted towards all mobiles nodes being served. In the case of CDMA, such session termination messages may comprise Link Control Protocol (LCP) Terminate messages. Responsive to receiving the session termination message 406, a delay randomization logic block 408 of MN 102 operates to delay the data session reconnect/retry process of the mobile node which would otherwise have been activated substantially immediately. Essentially, the delay randomization logic 408 operates to variably delay the generation of a data session reconnect/retry request based on randomization on a per-device basis. After the randomized delay, a suitable data session reconnect/retry request 410 may be generated by MN 102 towards the packet data I/F 302 of the network. Appropriate service logic associated with the packet data I/F 302 is operable to determine that the network node 304A which has been serving MN 102 is no longer available due to outage. Accordingly, the packet data I/F negotiates a new packet data connection with another network node, e.g., node 304B, using an applicable negotiation protocol 411. Upon successful negotiation, a new data session connection 412 may be established between MN 102 and the network node 304B.

Figure 4B:
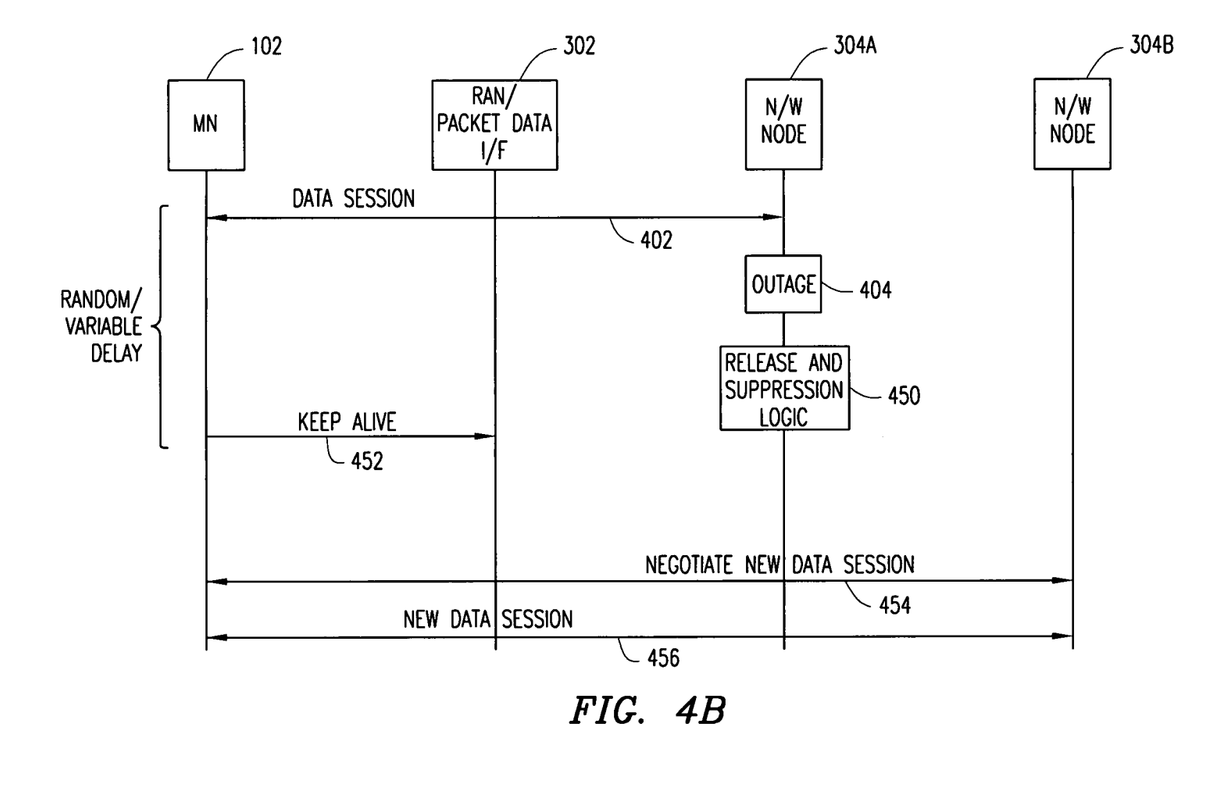
FIG. 4B depicts a message flow diagram in accordance with another embodiment of the present patent disclosure.

FIG. 4B depicts a message flow diagram in accordance with another embodiment of the present patent disclosure for managing network traffic load upon outage. In this alternative embodiment, the serving network node is provided with additional logic capabilities that would be triggered upon encountering an outage. As before, the network node 304A is illustrative of a current serving node with respect to MN 102. Upon encountering an outage 404, a release and suppression logic block 450 associated with the network node 304A is activated so as to suppress the generation of data session termination messages towards all mobile nodes being served. Also, associated data connections currently being maintained by the network node are released as well, preferably based on the extent and magnitude of the outage. Since there are no data session termination messages received, MN 102 does not generate any data session reconnect/retry message. On the other hand, MN 102 continues to propagate a heartbeat message, e.g., a "Keep Alive" message, at certain intervals towards the network as may be required by certain "always on" implementations. Because the time when a Keep Alive message is generated is based on the last active data transaction between MN 102 and the network node 304A, which is essentially a random time variable insofar as a large number of mobile nodes are concerned, each mobile node that has lost the data connection with the network node 304A accordingly generates a Keep Alive 452 message with a variable random delay as well. Upon receiving the Keep Alive message 452, appropriate service logic associated with the packet data I/F 302 is operable to determine, similar to the situation described above with respect to the message flow diagram of FIG. 4A, that the network node 304A which has been serving MN 102 is no longer available due to outage. Accordingly, the packet data I/F 302 negotiates a new packet data connection with another network node, e.g., node 304B, using an applicable negotiation protocol 454. Upon successful negotiation, a new data session connection 456 may be established between MN 102 and the network node 304B.

Figure 5A:
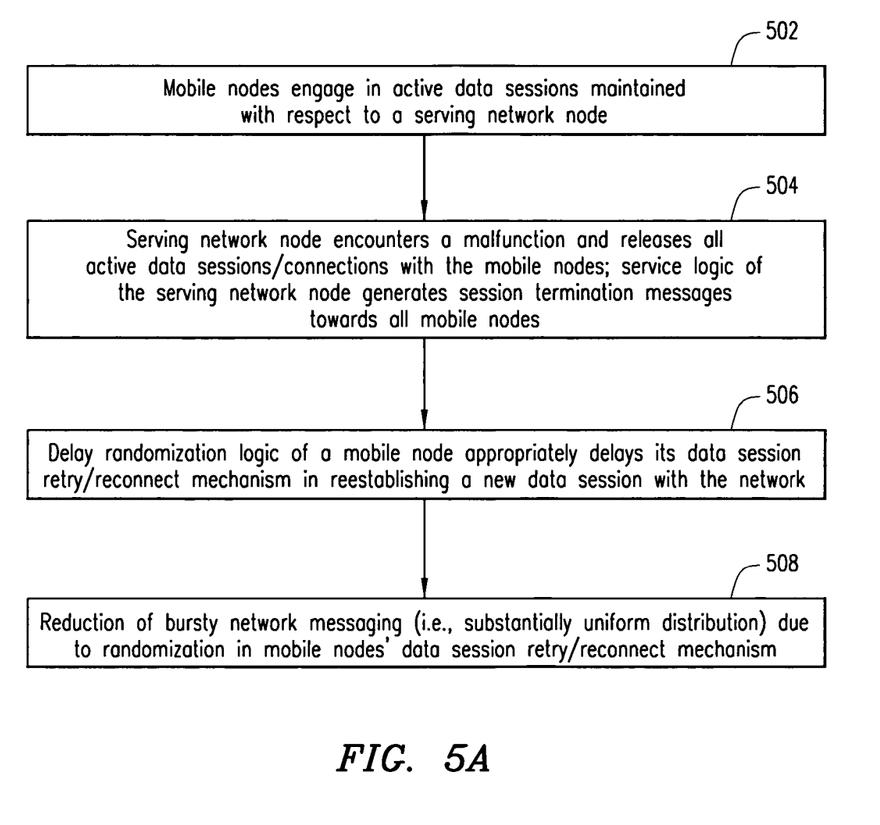
FIG. 5A depicts a flowchart that exemplifies various processes corresponding to the embodiment shown in FIG. 4A.

Referring now to FIG. 5A, depicted therein is a flowchart that exemplifies various processes corresponding to the embodiment shown in FIG. 4A. In the illustrated scenario, a plurality of mobile nodes, e.g., thousands of mobile nodes, are engaged in active data sessions that are maintained with respect to a serving network node, e.g., either a PDSN or a GGSN (block 502). When the serving network node encounters a malfunction causing outage, the service logic of the node generates appropriate session termination messages towards the mobile nodes pursuant to releasing all active data connections with the mobile nodes being served (block 504). Once the session termination messages are received and processed by the mobile nodes, appropriate delay randomization logic resident on the device variably delays its data session retry/reconnect mechanism with respect to reestablishing a new data session with the network (block 506). In one implementation, the delay logic is modulated based on generating a random time variable that may be bounded by a predetermined limit (e.g., 15 minutes). Further, depending on network load statistics, traffic management history, and the like, the predetermined limit value may be optimized for a certain theoretical maximum number of data connections being released by the network node. Likewise, the predetermined limit value may be optimized for the scenario where only a small number of data connections (i.e., a theoretical minimum number) are released. In a still further embodiment, additional capability may be provided to the mobile nodes whereby the total number of data connections that are actually lost is made available to the mobile nodes by the network via a suitable protocol. Upon receiving such information, the delay randomization logic on the mobile nodes can configure a suitable upper limit on the random delay amount.

Regardless of how the delay randomization logic is actually implemented in operation, it should be appreciated that randomizing the generation of reconnect requests by the mobile nodes towards the network may help reduce the burstiness of network messaging that would have resulted otherwise. Accordingly, the illustrated embodiment helps achieve a more uniform distribution of the mobile nodes' reconnect messaging, which in turn helps balancing of the traffic load in the network (block 508).

Figure 5B:
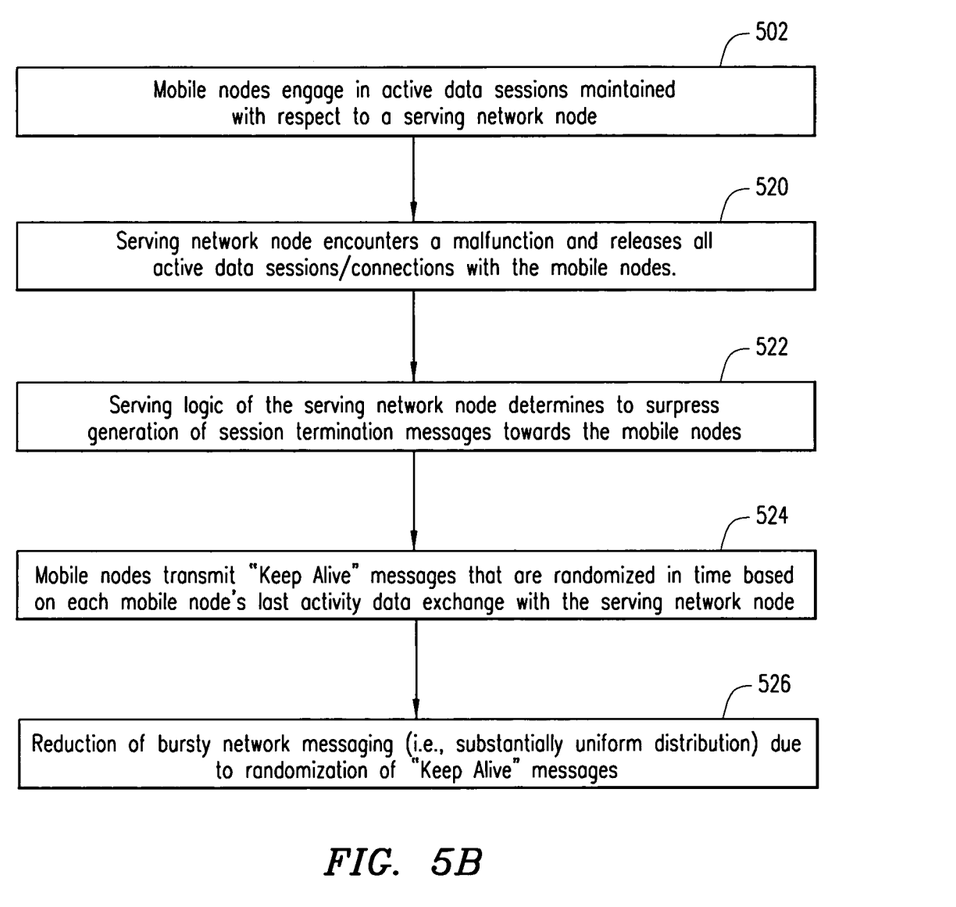
FIG. 5B depicts a flowchart that exemplifies various processes corresponding to the embodiment shown in FIG. 4B.

FIG. 5B depicts a flowchart that exemplifies various processes corresponding to the embodiment shown in FIG. 4B. As before, a plurality of mobile nodes, e.g., thousands of mobile nodes, are engaged in active data sessions that are maintained with respect to a serving network node, e.g., either a PDSN or a GGSN (block 502). Upon encountering an outage-causing malfunction, the serving network node releases all active data connections with the mobile nodes being served (block 520). The service logic of the network node determines to suppress the generation of session termination messages towards the mobile nodes (block 522), which would have otherwise triggered the data session retry mechanism on the mobile nodes as pointed out previously. Instead, the mobile nodes transmit Keep Alive messages that are randomized in time based on each mobile node's last active data exchange with the serving node (block 524). Responsive to the Keep Alive messages, the packet data I/F functionality of the network negotiates a new data connection with a secondary serving node (i.e., a standby node) for reestablishing new data sessions with respect to the mobile nodes. Whereas the heartbeat messages may be associated with a predetermined time interval, the base time from which that time interval is measured may be randomized. Further, the predetermined time interval may be optimized for both maximum and minimum number of data connections being released. At any rate, the inherent randomness of the mobile nodes' traffic while being connected, especially when a large number of mobile nodes are considered, imparts randomization to the generation of Keep Alive messages from each mobile node. Accordingly, the illustrated embodiment also helps achieve balancing of the traffic load in the network (block 526).

Figure 6:
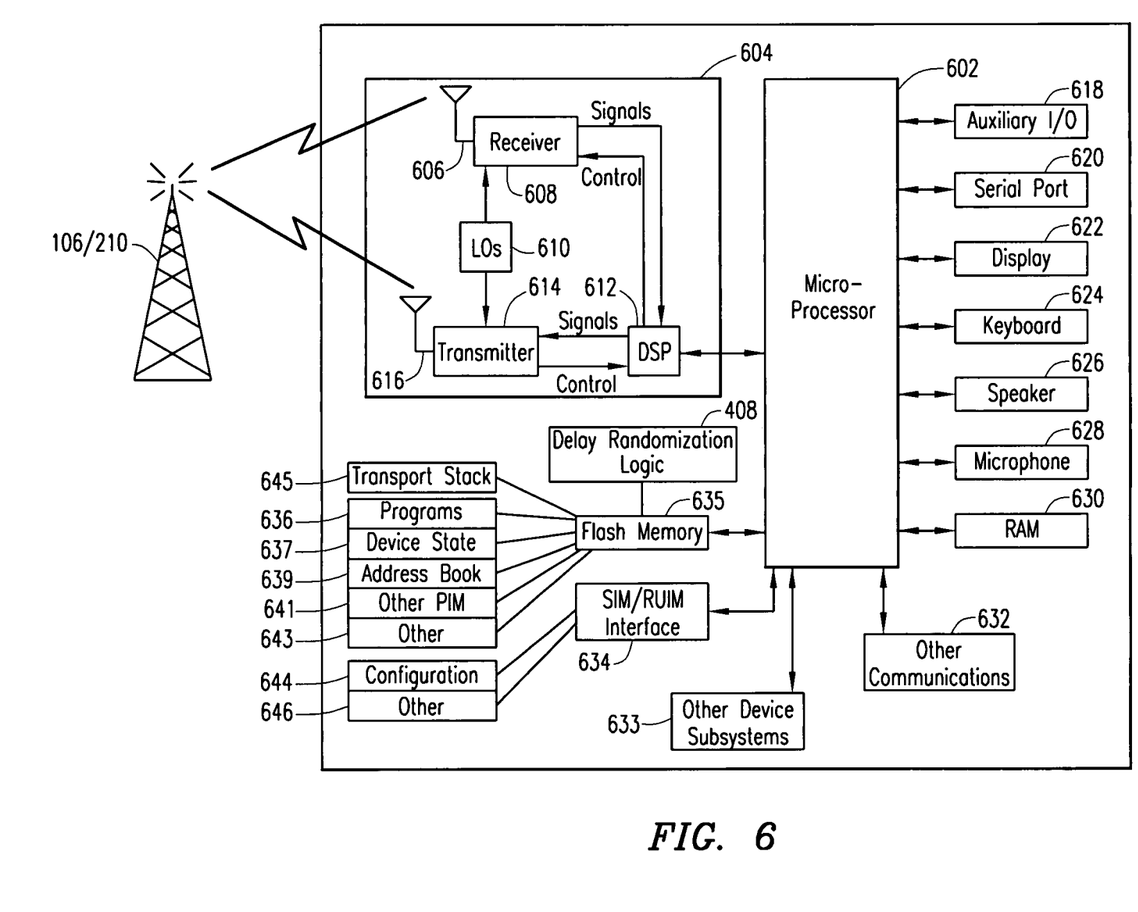
FIG. 6 depicts a block diagram of an embodiment of a communications device operable as a mobile node for purposes of the present patent disclosure.

FIG. 6 depicts a block diagram of an embodiment of a communications device operable as a mobile node for purposes of the present patent disclosure. It will be recognized by those skilled in the art upon reference hereto that although an embodiment of MN 102 may comprise an arrangement similar to one shown in FIG. 6, there can be a number of variations and modifications, in hardware, software or firmware, with respect to the various modules depicted. Accordingly, the arrangement of FIG. 6 should be taken as illustrative rather than limiting with respect to the embodiments of the present patent disclosure. A microprocessor 602 providing for the overall control of an embodiment of MN 102 is operably coupled to a communication subsystem 604 which includes a receiver 608 and a transmitter 614 as well as associated components such as one or more local oscillator (LO) modules 610 and a processing module such as a digital signal processor (DSP) 612. As will be apparent to those skilled in the field of communications, the particular design of the communication module 604 may be dependent upon the communications network with which the mobile device is intended to operate (e.g., a CDMA2000 network, a GPRS network, et cetera). Regardless of the particular design, however, signals received by antenna 606 through BTS 106/210 are provided to receiver 608, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 612, and provided to transmitter 614 for digital-to-analog (D/A) conversion, frequency up conversion, filtering, amplification and transmission over the air-radio interface via antenna 616.

Microprocessor 602 may also interface with further device subsystems such as auxiliary input/output (I/O) 618, serial port 620, display 622, keyboard/keypad 624, speaker 626, microphone 628, random access memory (RAM) 630, a short-range communications subsystem 632, and any other device subsystems generally labeled as reference numeral 633. To control access, a Subscriber Identity Module (SIM) or Removable user Identity Module (RUIM) interface 634 may also be provided in communication with the microprocessor 602. In one implementation, SIM/RUIM interface 634 is operable with a SIM/RUIM card having a number of key configurations 644 and other information 646 such as identification and subscriber-related data.

Operating system software and applicable transport stack software may be embodied in a persistent storage module (i.e., non-volatile storage) such as Flash memory 635. In one implementation, Flash memory 635 may be segregated into different areas, e.g., storage area for computer programs 636 (e.g., service processing logic), as well as data storage regions such as device state 637, address book 639, other personal information manager (PIM) data 641, and other data storage areas generally labeled as reference numeral 643. A transport stack 645 may be provided to effectuate one or more appropriate radio-packet transport protocols. Additionally, a delay randomization logic module 408 is provided for effectuating randomization of delay introduced in the device's data reconnect/retry mechanism as set forth hereinabove. It is therefore envisaged that at least following logic structures are implemented within the arrangement of FIG. 6: a logic structure (e.g., microprocessor 602) adapted for processing a session termination message that is received pursuant to releasing the mobile node's data connection by a network node upon encountering an outage-causing condition at the network node; and a logic structure, operable responsive to processing the session termination message, for delaying generation of a data session reconnect request by the mobile node, wherein the delaying is modulated based on generating a random time variable by the mobile node.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A method operable on a mobile node that is usable in a wireless packet data network, the method comprising:
   receiving a session termination message transmitted by a first network node to all mobile nodes being served by the first network node upon the first network node encountering an outage-causing condition;
   responsive to receiving said session termination message delaying generation of an initial data session reconnect request, wherein said delaying is modulated based on randomized delay and said mobile node is operable to configure a suitable upper limit on said randomized delay, said suitable upper limit depending on network load statistics and traffic management history and being optimized for a certain number of data connections, the certain number being one of: the total number of data connections that are released, a minimum number of data connections that can be released or a maximum number of data connections that can be released; and
   after said delaying, generating a reconnect request towards a data interface operable in the wireless packet data network, wherein the data interface is operable to negotiate a data connection between the mobile node and a second network node.

2. The method of managing network traffic load in a wireless packet data network as recited in claim 1, wherein said outage-causing condition comprises at least one of a power failure, a race condition experienced by service logic of said first network node, a manual reset, and an automatic shutdown.

3. The method of managing network traffic load in a wireless packet data network as recited in claim 1, wherein said randomized delay is based on generating a random time variable.

4. The method of managing network traffic load in a wireless packet data network as recited in claim 1, wherein said first and second network nodes comprise a Packet Data Serving Node (PDSN) and said respective data connections are operable to effectuate Point-to-Point Protocol (PPP) sessions with respect to said mobile node.

5. The method of managing network traffic load in a wireless packet data network as recited in claim 1, wherein said first and second network nodes comprise a Gateway GPRS (General Packet Radio Service) Support Node (GGSN) and said respective data connections are operable to effectuate Packet Data Protocol (PDP) sessions with respect to said mobile node.

6. The method of managing network traffic load in a wireless packet data network as recited in claim 1, wherein said first network node transmits information pertaining to said total number of data connections being released to said mobile node.

7. A method of managing network traffic load upon outage of a first network node disposed in a wireless packet data network, wherein said first network node is adapted to serve a plurality of mobile nodes using respective data connections, comprising:
   receiving a session termination message by a mobile node pursuant to said first network node releasing said mobile node's data connection upon encountering an outage-causing condition at said first network node and transmitting said session termination message to all mobile nodes being served by said first network node;
   responsive to receiving said session termination message, delaying generation of an initial data session reconnect request by said mobile node, wherein said delaying is modulated based on generating a random time variable by said mobile node and said mobile node is operable to configure a suitable upper limit on said random time variable, said suitable upper limit depending on network load statistics and traffic management history and being optimized for a certain number of data connections being released, said certain number being one of: the total number of data connections that are released, a minimum number of data connections that can be released or a maximum number of data connections that can be released; and
   after said delaying, said mobile node generating a reconnect request towards a data interface operable in the wireless packet data network, wherein said data interface is operable to determine that said first network node is not available and negotiate a data connection between said mobile node and a second network node.

8. The method of managing network traffic load upon outage of a network node disposed in a wireless packet data network as recited in claim 7, wherein said outage-causing condition comprises at least one of a power failure, a race condition experienced by service logic of said first network node, a manual reset, and an automatic shutdown.

9. The method of managing network traffic load upon outage of a network node disposed in a wireless packet data network as recited in claim 7, further comprising said mobile node receiving information pertaining to said total number of data connections being released by said first network node.

10. An apparatus for managing network traffic load in a wireless packet data network, wherein a first network node is adapted to serve a plurality of mobile nodes using respective data connections, comprising:
    means associated with a mobile node for receiving a session termination message pursuant to said first network node releasing said mobile node's data connection upon encountering an outage-causing condition at said first network node and transmitting said session termination message to all mobile nodes being served by said first network node;
    means associated with said mobile node, operable responsive to receiving said session termination message, for delaying generation of an initial data session reconnect request by said mobile node, wherein said delaying is modulated based on generating a random time variable by said mobile node and said means for delaying generation is operable to configure a suitable upper limit on said random time variable, said suitable upper limit depending on network load statistics and traffic management history and being optimized for a certain number of data connections, the certain number being one of: the total number of data connections that are released, a minimum number of data connections that can be released or a maximum number of data connections that can be released; and means associated with said mobile node, operable responsive to said delaying, for generating a reconnect request to data interface operable in said wireless packet data network for determining that said first network node is not available and negotiating a data connection between said mobile node and a second network node.

11. The apparatus for managing network traffic load in a wireless packet data network as recited in claim 10, wherein said random time variable is modulated based on a total number of data connections being released by said first network node.

12. The apparatus for managing network traffic load in a wireless packet data network as recited in claim 11, wherein said mobile node receives information pertaining to said total number of data connections being released by said first network node.

13. A mobile node operable in a wireless packet data network, comprising:

a logic structure adapted for processing a session termination message that is transmitted by a first network node to all mobile nodes being served by the first network node upon encountering an outage-causing condition at said first network node;

a logic structure, operable responsive to processing said session termination message, for delaying generation of an initial data session reconnect request by said mobile node, wherein said delaying is modulated based on generating a random time variable by said mobile node and said logic structure for delaying generation is operable to configure a suitable upper limit on said random time variable, said suitable upper limit depending on network load statistics and traffic management history and being optimized for a certain number of data connections, the certain number being one of: the total number of data connections that are released, a minimum number of data connections that can be released or a maximum number of data connections that can be released; and a logic structure operable to generate a reconnect request to a data interface operable within said wireless packet data network after said delaying, said data interface operable to determine that said first network node is not available and negotiate a data connection between said mobile node and a second network node.

14. The mobile node as recited in claim 13, wherein said mobile node receives information pertaining to said total number of data connections being released by said first network node.

* * * * *